Patented Dec. 4, 1951

2,577,566

UNITED STATES PATENT OFFICE 2,577,566

3-THIENYL THIOETHERS

John W. Brooks, Wenonah, and Sigmund J. Lukasiewicz, Woodbury, N. J., assignors to Socony-Vacuum Oil Company, Incorporated, a corporation of New York No Drawing. Original application December 13, 1947, Serial No. 791,652. Divided and this application November 22, 1948, Serial No. 61,524

1 Claim. (Cl. 260—329)

This invention relates to a group of new chemical compounds, namely, 3-thienyl thioethers. More specifically, the present invention is directed to an improvement of viscous mineral oil fractions by incorporation therein of a small proportion sufficient to improve the properties thereof of one or more of the aforesaid compounds.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested. That is, the products formed in an oil fraction as a result of oxidation and the degree to which they are formed depend on the extent to which the various unstable constituents or constituents which may act as oxidation catalysts have been removed by refining operations and also upon the conditions of use.

The present invention is predicated upon the discovery that a group of new chemical compounds, the 3-thienyl thioethers, greatly improve the oxidation characteristics of mineral oil fractions by the incorporation therein of minor proportions of these compounds. It has been found that by the addition of a 3-thienyl thioether to a viscous mineral oil fraction, the development of undesirable products and properties, such as acid, sludge, discoloration, and corrosiveness toward alloy-bearing metals, normally encountered under conditions of use, has been substantially inhibited.

The compounds of this invention may be designated by the general formula:

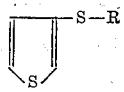

where R represents an alkyl, aralkyl, aryl, or alicyclic group. These compounds may suitably be prepared by the action of an appropriate organic halide on 3-thiophenethiol in the presence of alcoholic potassium hydroxide or similar alkaline condensing agents. Under such conditions, the hydrogen of the mercapto group in the 3-thiophenethiol is replaced by the alkyl, aralkyl, aryl, or alicyclic group of the organic halide employed to yield the desired 3-thienyl thioether. The reaction thus takes place in accordance with the following general equation:

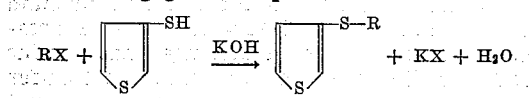

An alternate method of synthesizing the compounds of this invention comprises the reaction of an olefin with 3-thiophenethiol. The reaction may be effected either in the presence of an alkylation catalyst such as boron trifluoride, sulfuric acid, silica-alumina composite, boron trifluoride-etherate, and other complexes of boron trifluoride; or where a highly reactive olefin is employed, such as isobutylene, styrene, etc., the reaction may be effected in the absence of a catalyst, even at room temperature. In general, the temperature at which the above reaction is carried out will be between about 20° C. and about 250° C. The particular conditions of temperature employed will depend in part on the nature of the olefin used. Olefins containing a double bond connected to a tertiary carbon atom react with 3-thiophenethiol at relatively lower temperatures in the above range. On the other hand, when compounds having an olefinic bond not connected to a tertiary carbon atom are employed, relatively higher temperatures in the upper portion of the above range must be used. The reaction of olefins with 3-thiophenethiol under the above conditions appears to be a selective reaction in which the mercapto group is involved, since little or no alkylation of the thiophene nucleus has been found to take place. The aforementioned reactant of 3-thiophenethiol may be prepared by the procedure described in Chem. Inds. 60, 593–5, 620 (1947) or by any other feasible method.

Any of the commonly employed alkylation catalysts are contemplated for use in promoting the reaction of 3-thiophenethiol with an olefin. The nature of the reaction product obtained appears to depend upon whether the reaction is carried out in the absence or presence of an alkylation catalyst. Thus, the manner of addition of the olefin to the thiophenethiol employed will, in the absence of a catalyst, be contrary to the mode of addition implied by Markownikoff's rule. In the presence of an alkylation catalyst such as sulfuric acid, silica-alumina composites, boron trifluoride and complexes thereof, the mode of addition of olefin to 3-thiophenethiol follows Markownikoff's rule. The distinction between the nature of the products obtained in each instance will be readily apparent from the following general equations indicating the course of reaction.

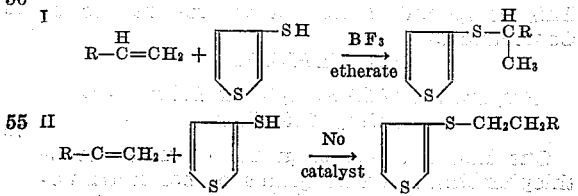

It will be noted that in the case of Equation I, Markownikoff's rule was followed. In the case of Equation II, the rule was not followed. Thus, the products formed from catalytic and non-catalytic alkylation reactions will generally be of a different structure. However, in every instance, the product is a 3-thienyl thioether.

The above alkylation reactions will usually be carried out with a molar ratio of thiophenethiol to olefin of between about 2 to 1 and about 1 to 10 and generally in the presence of an alkylation catalyst of which the boron trifluoride complexes may be considered to be a preferred embodiment. In particular, boron trifluoride-etherate has been found to be an effective catalyst in promoting the reaction.

The nature of the organic substituent group present in the 3-thienyl thioethers described herein may be either saturated or unsaturated, may be either a straight chain or branched chain, monocyclic or polycyclic group, may contain one or more aromatic groups and may have attached thereto through a thioether linkage one or more thienyl groups. Thus, the organic substituent may be a thienyl thioalkyl group. Representative of the alkyl, aryl, alicyclic, and aralkyl-3-thienyl thioethers are benzyl, allyl, nonyl, octyl, propyl, butyl, amyl, pinyl, dodecyl, tetradecyl, hexyl, etc.; also, such compounds as 1,2-di-3-thienyl thioethane, 1,2,3-tri-3-thienyl thiopropane, 1,4-di-3-thienyl thiobutane, and the like. This list, of course, is not to be construed as limiting, since the present invention contemplates alkyl, aryl alicyclic, and aralkyl-3-thienyl thioethers generally. Those skilled in the art will readily recognize various other alkyl, aryl, alicyclic, or aralkyl thienyl thioethers which may be synthesized according to the above described procedures.

The preparation of the compounds of the present invention may be illustrated by the following examples, which are given by way of illustration and not intended to be a limitation on the scope of the invention.

EXAMPLE I

*Preparation of tetradecyl-3-thienyl thioether*

One hundred sixteen grams (1 mole) of 3-thiophenethiol, 233 grams (1 mole) of tetradecyl-chloride, and 100 milliliters of ethyl alcohol were placed in a flask. A solution of 56 grams of potassium hydroxide in 75 milliliters of water and 150 milliliters of ethyl alcohol was added dropwise over a period of 1½ hours with the temperature of the flask being maintained at 60° C. At the end of this time, the reaction mixture was refluxed for 3 hours. Water was then added and the reaction mixture cooled and filtered. The solid which was thus collected was recrystallized from petroleum ether a number of times. An 80 per cent yield of tetradecyl-3-thienyl ether was obtained. This product had a melting point of 44-45° C., a sulfur content of 20.8 per cent, a carbon content of 69.15 per cent and a hydrogen content of 10.56 per cent. The theoretical sulfur content for the compound is 20.5 per cent. This compound is hereinafter referred to as Compound I.

EXAMPLE II

*Preparation of 1,1,3,3-tetramethylbutyl-3-thienyl thioether*

One hundred sixteen grams (1 mole) of 3-thiophenethiol and 20 grams of boron trifluoride-etherate (containing 45 per cent boron trifluoride) were mixed together and 224 grams (2 moles) of diisobutylene were slowly added. The temperature was maintained at about 45° C. during the addition of the olefin. After complete addition thereof, the mixture was agitated at room temperature for 3 hours. At the end of this time, the reaction product was distilled to give a 76 per cent yield, based on the weight of thiophenethiol of 1,1,3,3-tetramethylbutyl-3-thienyl thioether. This product had a boiling point of 102-110° C. at 0.5 millimeters of mercury and a sulfur content of 28.32 per cent, the theoretical sulfur content being 28.07 per cent. This product is hereinafter referred to as Compound II.

EXAMPLE III

*Preparation of 1-methylheptyl-3-thienyl thioether*

Two hundred thirty-two grams (2 moles) of 3-thiophenethiol and 336 grams (3 moles) of octene-1 and 150 grams of petroleum ether and 75 grams of a silica-alumina catalyst were placed in a shaking bomb and reacted at a temperature of about 205° C. for a period of 3 hours. At the end of this time, petroleum ether, unreacted thiophenethiol, and unreacted octene-1 were topped off. The remaining product was distilled under vacuum at a temperature of 105-132° C. at a pressure of 1 millimeter to give 204 grams of 1-methylheptyl-3-thienyl thioether having a sulfur content of 27.5 per cent, the theoretical sulfur content being 28.07 per cent. This product is hereinafter referred to as Compound III.

EXAMPLE IV

*Preparation of benzyl-3-thienyl thioether*

Two hundred thirty-two grams (2 moles) of 3-thiophenethiol, 254 grams (2 moles) of benzyl chloride and 200 milliliters of ethyl alcohol were placed in a flask. A solution of 112 grams (2 moles) of potassium hydroxide in 150 milliliters of ethyl alcohol was added dropwise over a period of 7 hours with the temperature of the flask being maintained at 45-50° C. by the heat of reaction. At the end of this time, the reaction mixture was water-washed, dried over magnesium sulfate, and the unreacted materials distilled off. An 81 per cent yield of benzyl-3-thienyl thioether was obtained. After recrystallization from petroleum ether a number of times, the product had a melting point of 37-38° C. and a sulfur content of 31.1 per cent, the theoretical sulfur content being 31.08 per cent. This compound is hereinafter referred to as Compound IV.

EXAMPLE V

*Preparation of pinyl-3-thienyl thioether*

One hundred seventy-five grams (1.5 moles) of 3-thiophenethiol and 10 grams of boron trifluoride-ether complex were placed in a flask. Two hundred five grams (1.5 moles) of α-pinene were added at such a rate as to maintain the temperature in the range of 40—45° C. At the completion of the reaction, the resulting mixture was washed with potassium hydroxide solution, then with water, and finally dried over magnesium sulfate. The dried product was then distilled and a 55 per cent yield of pinyl-3-thienyl thioether was obtained. This compound had a boiling point of 118-122° C. at a pressure of 0.7 millimeter of mercury and a sulfur content of 25.6 per cent, the theoretical sulfur content being 25.50 per cent. This compound is hereinafter referred to as Compound V.

EXAMPLE VI

*Preparation of allyl-3-thienyl thioether*

Three hundred forty-eight grams (3 moles) of 3-thiophenethiol, 231 grams (3 moles) of allyl chloride, and 300 milliliters of ethyl alcohol were placed in a flask. A solution of 168 grams (3 moles) of potassium hydroxide in 200 milliliters of water and 300 milliliters of ethyl alcohol was added at such a rate that the heat of reaction maintained the temperature of the mixture at about 40° C. The mixture was then stirred at a temperature of 45° C. for a period of 3 hours after the completion of the addition. The resulting product was then water-washed and dried over magnesium sulfate. Upon distillation, an 86 per cent yield of allyl-3-thienyl thioether was obtained. This compound had a boiling point of 50–54° C. at a pressure of 0.4 millimeter of mercury and a sulfur content of 41.2 per cent, the theoretical sulfur content being 41.04 per cent. This compound is hereinafter referred to as Compound VI.

EXAMPLE VII

*Preparation of 2-phenylethyl-3-thienyl thioether*

One hundred sixteen grams (1 mole) of 3-thiophenethiol and 104 grams (1 mole) of styrene were mixed. The mixture became quite warm after about 5 minutes of mixing and it was cooled in an ice bath until the temperature had subsided. After standing at room temperature for several days, the reaction mixture was washed with aqueous potassium hydroxide solution, then with water, and finally dried over magnesium sulfate. Distillation of the dried mixture resulted in a 67 per cent yield of 2-phenylethyl-3-thienyl thioether. This material had a boiling point of 120–122° C. at a pressure of 0.5 millimeter of mercury and a sulfur content of 28.9 per cent, the theoretical sulfur content being 29.10 per cent. This compound is hereinafter referred to as Compound VII.

EXAMPLE VIII

*Preparation of nonyl-3-thienyl thioether*

Three hundred thirty-two grams (2.86 moles) of 3-thiophenethiol and 10 grams of boron trifluoride-ether complex were placed in a flask. To this mixture 378 grams (3 moles) of mixed nonenes were added at such a rate that the temperature of the reaction mixture was maintained at about 45° C. After the addition of the nonenes was completed, the reaction mixture was stirred at a temperature of 45–50° C. for a period of 4 hours. The resulting reaction mixture was washed with potassium hydroxide solution, then with water, and finally dried over magnesium sulfate. Upon distillation of the dried reaction mixture, a 52 per cent yield of nonyl-3-thienyl thioether was obtained. This compound had a boiling point in the range of 105–110° C. at a pressure of one millimeter of mercury and a sulfur content of 26.6 per cent, the theoretical sulfur content being 26.44 per cent. This compound is hereinafter referred to as Compound VIII.

EXAMPLE IX

*Preparation of 1,2,3-tri-3-thienyl thiopropane*

Seventy-five grams (0.5 mole) of 1,2,3-trichloropropane, 203 grams (1.75 moles) of 3-thiophenethiol, and 150 milliliters of ethyl alcohol were added to a flask. A solution of 98 grams of potassium hydroxide (1.75 moles) in 125 milliliters of water and 200 milliliters of ethyl alcohol was slowly added to the flask. The temperature was maintained at about 50° C. during this addition. At the end of this time, the resulting reaction mixture was diluted with water and extracted with ethyl ether. The ether solution was then topped to a pot temperature of 100° C. under one millimeter of mercury after first removing the ether at atmospheric pressure. The resulting product had a sulfur content of 41.8 per cent and a chlorine content of 9.26 per cent. This reaction was incomplete, so 85 grams of the reaction product were mixed with 50 grams of 3-thiophenethiol and 20 grams of potassium hydroxide in 200 milliliters of ethyl alcohol and heated to a temperature of 75° C. for a period of 2 hours. After washing with water, drying and topping off the ethyl alcohol, 1,2,3-tri-3-thienyl thiopropane was obtained, having a sulfur content of 49.62 per cent, the theoretical sulfur content being 49.75 per cent. This compound is hereinafter referred to as Compound IX.

EXAMPLE X

*Preparation of isopropyl-3-thienyl thioether*

Two hundred thirty-two grams (2 moles) of 3-thiophenethiol, 172 grams of isopropyl chloride (2.1 moles) and 112 grams of potassium hydroxide in 300 milliliters of ethyl alcohol and 300 milliliters of water were heated in an autoclave at a temperature of 110–120° C. for one hour. The resulting reaction mixture was extracted with ethyl ether and the ether extract so obtained was washed with HCl and dried over magnesium sulfate. Upon distillation, a 79 per cent yield of isopropyl-3-thienyl thioether was obtained. This material had a boiling point of 65–66° C. at a pressure of 3 millimeters of mercury and a sulfur content of 39.8 per cent, the theoretical sulfur content being 40.56 per cent. This compound is hereinafter referred to as Compound X.

EXAMPLE XI

*Preparation of tertiarybutyl-3-thienyl thioether*

Eighty-five grams (0.72 mole) of 3-thiophenethiol and 7 cubic centimeters of boron trifluoride-ether complex were placed in a flask and isobutylene was passed through the solution, which was maintained at a temperature between 55° C. and 80° C. After an hour, the addition of isobutylene was stopped. The resulting reaction mixture was washed with water, filtered, and dried over magnesium sulfate. Upon distillation of the dried reaction mixture, a 42 per cent yield of tertiarybutyl-3-thienyl thioether was obtained. This material had a boiling point of 65–67° C. at one millimeter of mercury and a sulfur content of 36.85 per cent, the theoretical sulfur content being 37.22 per cent. This compound is hereinafter referred to as Compound XI.

EXAMPLE XII

*Preparation of dodecyl-3-thienyl thioether*

One hundred sixteen grams (1 mole) of 3-thiophenethiol and 25 grams of boron trifluoride-ether complex were placed in a flask. Three hundred thirty-six grams (2 moles) of dodecene were added dropwise at such a rate to maintain the temperature at about 45° C. After all of the dodecene was added, the reaction mixture was washed with aqueous potassium hydroxide solution, then with water, and finally dried over magnesium sulfate. Upon distillation, a 60 per cent yield of dodecyl-3-thienyl thioether was obtained. This material had a boiling point of 174–176° C. at a pressure of 8 millimeters of mercury and a sulfur content of 23.04 per cent, the theoretical sulfur content being 22.54 per cent. This compound is hereinafter referred to as Compound XII.

EXAMPLE XIII

*Preparation of wax-3-thienyl thioether*

One hundred fifty grams (1.3 moles) of 3-thiophenethiol, 250 grams of chlorowax (containing 11 per cent chlorine) and 200 cubic centimeters of ethyl alcohol were added to a flask. A solution of 84 grams (1.5 moles) of potassium hydroxide in 100 cubic centimeters of water and 200 cubic centimeters of ethyl alcohol was added at such a rate that the temperature was maintained in the range of 50–55° C. After the addition of potassium hydroxide solution was completed, the mixture was stirred at a temperature of 75° C. for 2 hours. The resulting reaction mixture was diluted with water and extracted with petroleum ether. The ether extract so obtained was washed with aqueous potassium hydroxide solution and water, and finally dried over magnesium sulfate. This extract was topped to a pot temperature of 100° C. under one millimeter of mercury to yield wax-3-thienyl thioether having a sulfur content of 21.59 per cent. This compound is hereinafter referred to as Compound XIII.

EXAMPLE XIV

*Preparation of 1,2-di-3-thienyl thioethane*

Four hundred six grams (3.5 moles) of 3-thiophenethiol were placed in a flask and 196 grams of potassium hydroxide (3.5 moles) in 450 cubic centimeters of ethyl alcohol and 200 cubic centimeters of water were added. Four hundred forty-nine grams (1.5 moles) of ethylene chloride were added at such a rate to maintain the temperature in the range of 45–50° C. After the addition was completed, the reaction mixture was stirred at 75° C. for 5 hours. The resulting reaction mixture was washed well with water and 375 grams of white solid formed, representing a yield of 97 per cent of 1,2-di-3-thienyl thioethane, based on the weight of ethylene chloride. This material was recrystallized from cyclohexane and had a melting point of 54–55° C. and a sulfur content of 49.41 per cent, the theoretical sulfur content being 49.62 per cent. This compound is hereinafter referred to as Compound XIV.

EXAMPLE XV

*Preparation of 1,4-di-3-thienyl thiobutane*

Four hundred six grams (3.5 moles) of 3-thiophenethiol and 196 grams of potassium hydroxide in 200 cubic centimeters of water and 350 cubic centimeters of ethyl alcohol were added to a flask. One hundred ninety-one grams (1.5 moles) of tetramethylene chloride were added at such a rate that the temperature was maintained in the range of 45–50° C. After the addition was completed, the temperature of the mixture was raised to 75° C. and kept there for a period of 4 hours. The resulting reaction mixture was washed well with water to give white, flaky crystals of 1,4-di-3-thienyl thiobutane in 87 per cent yield. This material was recrystallized from cyclohexane and had a melting point of 62–63° C. and a sulfur content of 44.05 per cent, the theoretical sulfur content being 44.62 per cent. This compound is hereinafter referred to as Compound XV.

EXAMPLE XVI

*Preparation of 2,4-dinitrophenyl-3-thienyl thioether*

To a flask were added 6 grams of 3-thiophenethiol dissolved in 150 milliliters of ethyl alcohol, 3 grams of potassium hydroxide in 15 milliliters of water, and 10 grams of 2,4-dinitro-chlorobenzene in 50 milliliters of alcohol. The resulting mixture was refluxed for 15 minutes. Water was added to the resulting reaction mixture and the product was separated. This product of 2,4-dinitrophenyl-3-thienyl thioether was recrystallized several times from ethyl alcohol and had a melting point of 133° C. and a sulfur content of 22.4 per cent, the theoretical sulfur content being 22.71 per cent.

The 3-thienyl thioethers of this invention have been found to be valuable as additives in the stabilization of petroleum oil fractions, particularly in inhibiting the development of those undesirable products and properties such as acid, sludge, discoloration, and corrosiveness toward alloy-bearing metals normally encountered under conditions of use. Thus, it is well known that motor oils, especially those refined by certain solvent-extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of Chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil and the loss in weight of the bearing section in the inhibited oil can thus be compared directly with the loss in the uninhibited oil. The results obtained in this test employing minor proportions of the above described compounds as inhibitors are set forth in the following table:

| Compound Added | Concentration, in Per Cent | Mg. Loss in Weight |
|---|---|---|
| None | 0 | 20 |
| I | 0.5 | 3.0 |
|   | 1.00 | 0 |
| II | 0.25 | 0 |
|   | 1.00 | 0 |
| III | 0.5 | 1 |
| IV | 0.25 | 10 |
|   | 1.00 | 3 |
| V | 0.25 | 2 |
|   | 1.00 | 1 |
| VI | 0.25 | 1 |
|   | 1.00 | 0 |

| Compound Added | Concentration, in Per Cent | Mg. Loss in Weight |
|---|---|---|
| VII | 0.25 / 1.00 | 9 / 3 |
| VIII | 0.5 / 1.00 | 1 / 1 |
| IX | 0.25 / 1.00 | 0.01 / 0.01 |
| X | 0.5 / 1.00 | 10 / 2 |
| XI | 1.00 | 0 |
| XII | 0.5 / 1.00 | 0 / 0 |
| XIII | 0.25 / 0.5 | 1 / 0 |
| XIV | 0.25 / 0.5 / 0.12 | 2 / 0 / 7 |
| XV | 0.25 / 0.5 | 0 / 0 |

A second test to which an oil containing a minor proportion of the compounds of this invention was subjected consisted essentially of passing oxygen through a 150-gram sample of oil at a rate of 2 liters per hour for a period of 70 hours at a temperature of 250° F. and measuring the neutralization number of the oil at the end of the test. In this test, the base oil containing no additive developed a neutralization number of about 20. The following data indicate that the compounds of this invention are effective in inhibiting the development of acidity in a mineral oil when the same is subjected to oxidation conditions as evidenced by the comparatively low neutralization number of such oils at the completion of the above test. In each of the oils tested, 0.1 per cent by weight of a compound of this invention was incorporated therein.

| Compound Added | Neutralization Number | Compound Added | Neutralization Number |
|---|---|---|---|
| None | 20 | VIII | 0.02 |
| I | 0.05 | IX | 0.02 |
| II | 0.02 | X | 0.01 |
| III | 0.00 | XI | 0.01 |
| IV | 5.3 | XII | 0.02 |
| V | 0.02 | XIII | 0.04 |
| VI | 0.02 | XIV | 0.00 |
| VII | 0.02 | XV | 0.02 |

From the foregoing test results, it will be evident that the 3-thienyl thioethers of this invention are effective stabilizing agents for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the compositions will be added to mineral oil fractions in an amount ranging from about 0.1 to about 4 per cent, but may be added in amounts up to 10 per cent by weight in some instances.

The effectiveness of the above stated minor proportions of 3-thienyl thioethers for stabilizing petroleum lubricating oil fractions is particularly unexpected when it is considered that similar amounts of aliphatic thioethers, such as didodecyl thioether and dioctylthioether, are ineffective in inhibiting the tendency of oils to corrode metal bearings. Moreover, the thienyl thioethers of this invention give definitely better bearing protection and less oil oxidation than do the corresponding phenyl thioethers. This latter fact is readily brought out by the following comparative test results in which a blank oil, an oil containing a minor proportion of a thienyl thioether and an oil containing the same minor proportion of the corresponding phenyl thioether were subjected to a Lauson engine test. In this test, a single cylinder Lauson engine was run at a speed of 1825 R. P. M. with an oil temperature of 270° F. and a jacket temperature of 212° F. The oil used was an S. A. E. 20 motor oil having a kinematic viscosity of 8.6 at 210° F. The viscosity in centistokes at 210° F. of the oil and oil blends and the extent of corrosion as measured by the loss in weight of the copper-lead bearings were determined after 100 hours. The results are set forth in the table below:

| Compound Added | Per Cent Conc. | Bearing Wt. Loss [1] (Grams) | K. V. at 210° F. | Per Cent Viscosity Increase |
|---|---|---|---|---|
| None | | 0.500 | 11.37 | 38 |
| Tetradecyl phenyl thioether | 1 | 0.340 | 10.81 | 25.7 |
| Tetradecyl 3-thienyl thioether | 1 | 0.111 | 9.5 | 10.5 |
| Isopropyl phenyl thioether | 1 | 0.620 | 11.53 | 41.8 |
| Isopropyl 3-thienyl thioether | 1 | 0.423 | 11.15 | 29.7 |
| Nonyl-3-thienyl thioether | 1 | 0.053 | 9.79 | 17 |
| 1,2,3-tri-3-thienyl thiopropane | 1 | 0.008 | 9.69 | 15 |

[1] Average weight loss of top and bottom ½ bearings.

It will be observed from the foregoing examples and the results set forth that the 3-thienyl thioethers are uniformly effective in inhibiting the deleterious effects of oxidation upon viscous mineral oil fractions which have been subjected to the various methods of refining treatment currently used. In other words, these compounds are effective as inhibitors in highly refined oils, moderately refined oil, and solvent refined oils.

It is to be understood that the examples, procedures, and oil compositions described hereinabove are illustrative only and are not to be construed as limiting the scope of this invention thereto. Thus, in addition to the specific compounds set forth herein, other 3-thienyl thioethers falling within the scope of the above disclosed general formula may similarly be employed as additives in improving the properties of viscous mineral oil fractions normally subject to deterioration under oxidizing conditions.

This application is a division of copending application Serial No. 791,652, filed December 13, 1947, and issued as U. S. 2,480,832 on September 6, 1949.

We claim:

As a new composition of matter, allyl-3-thienyl thioether.

JOHN W. BROOKS.
SIGMUND J. LUKASIEWICZ.

REFERENCES CITED

The following references are of record in the file of this patent:

UNITED STATES PATENTS

| Number | Name | Date |
|---|---|---|
| 2,411,961 | Evans | Dec. 3, 1946 |

OTHER REFERENCES

Steinkopf: Liebig's Ann. Chem., vol. 495, page 166 (1932).

Steinkopf: "Die Chemie Des Thiophens," pp. 100, 101, Steinkopf, Dresden, 1941. Edwards Lithoprint, 1944.

Hackh's Chemical Dictionary, Ed. 3, page 78, item Aryl. Blakiston, Phila., 1946.